(12) United States Patent
Aghadavoodi Jolfaei

(10) Patent No.: US 10,769,003 B2
(45) Date of Patent: Sep. 8, 2020

(54) APPLICATION SERVER PROGRAMMING LANGUAGE CLOUD FUNCTIONS

(71) Applicant: SAP SE, Walldorf (DE)

(72) Inventor: Masoud Aghadavoodi Jolfaei, Wiesloch (DE)

(73) Assignee: SAP SE, Walldorf (DE)

(*) Notice: Subject to any disclaimer, the term of this patent is extended or adjusted under 35 U.S.C. 154(b) by 51 days.

(21) Appl. No.: 16/243,377

(22) Filed: Jan. 9, 2019

(65) Prior Publication Data
US 2020/0218586 A1 Jul. 9, 2020

(51) Int. Cl.
G06F 3/00 (2006.01)
G06F 9/44 (2018.01)
G06F 9/46 (2006.01)
G06F 13/00 (2006.01)
G06F 9/54 (2006.01)
H04L 29/08 (2006.01)

(52) U.S. Cl.
CPC ............ *G06F 9/542* (2013.01); *H04L 67/141* (2013.01)

(58) Field of Classification Search
CPC ....................................................... G06F 9/542
USPC ........................................................ 719/318
See application file for complete search history.

(56) References Cited

U.S. PATENT DOCUMENTS

2017/0149915 A1* 5/2017 Jolfaei .................. H04L 67/327

OTHER PUBLICATIONS

Tim Nusch, "Enabling real-time bidirectional client-server communication using ABAP Push Channel", dated Jun. 20, 2014, sap.com, pp. 1-7.*

* cited by examiner

*Primary Examiner* — Timothy A Mudrick
(74) *Attorney, Agent, or Firm* — Schwegman Lundberg & Woessner, P.A.

(57) ABSTRACT

In an example, a Web Socket is used as an abstraction layer on top of one or more triggers. These triggers may be defined by DevOps tools and may be called bidirectionally. Specifically, a web application can call a trigger located in a Function as a Service layer at an ABAP application server, while the ABAP application server can also push data via a push channel through the WebSocket to trigger functions in the Web App.

20 Claims, 14 Drawing Sheets

| | | |
|---|---|---|
| LF | = <US-ASCII LF, LINEFEED (DECIMAL 10, HEXADECIMAL 0A)> | |
| ESCAPING-CHAR | = "\" USED TO ESCAPE SPECIAL-CHAR, E.G. LF, ":" AND "\" | |
| PCP-MESSAGE | = PCP-FIELDS LF<br>   *(FIELDS LF) LF<br>   (BODY-TEXT \| BODY-BINARY) | |
| PCP-FIELDS<br>*(FIELDS) | = "PCP-ACTION" ":" PCP-ACTION-VALUE LF<br>   *(PCP-ATTRIBUTES)<br>   "PCP-BODY-TYPE" ":" PCP-BODY-TYPE LP | |
| PCP-ACTION-VALUE | = MESSAGE" \| ... (TBD) | |
| PCP-BODY-TYPE | = "TEXT" \| "BINMARY" | |
| PCP-ATTRIBUTES | = "PCP[-CHANNEL" ":" FIELD-VALUE LF | |
| FELDS | = FIELD-NAME ":" FIELD-VALUE | |
| FIELD-NAME | = ANY UTF-8 CHARACTERS EXCEPT SPECIAL-CHAR | |
| FIELD-NAME | = ANY UTF-8 CHARACTERS EXCEPT SPECIAL-CHAR | |
| SPECIAL-CHAR | = LF \|":"\| "\" | |
| ESCAPE-SEQUENCE | = REPLACE "\" BY "\\" \| REPLACE ":" BY "\:" \| REPLACE LF BY "\N" | |
| BODY-TEXT | = ANY UTF-8 CHARACTERS | |
| BODY-BINARY | = ANY BYTES ENCODED IN BASE64 FORMAT | |

| PCP-ACTION:MESSAGE PCP-BODY-TYPE:TEXT FIELD1.VALUE1 FIELD2.VALUE2 THIS IS THE BODY ! | 85 | 15:57:34.007 |

302

| 1 | PCP-ACTION:MESSAGE |
| 2 | PCP-BODY-TYPE:TEXT |
| 3 | FIELD1:VALUE1 |
| 4 | FIELD2:VALUE2 |
| 5 |  |
| 6 | THIS IS THE BODY ! |

*Figure 3*

| PCP-ACTION:MESSAGE PCP-CHANNEL:APC\://PING_PCP-BODY-TYPE: TEXT FIELD1:VALUE1 FIELD2:VALUE2 COUNTER:1 THIS IS THE BODY ! | 124 | 15:57:34.010 |

400

| 1 | PCP-ACTION:MESSAGE |
| 2 | PCP-CHANNEL:APC\://PING_PCP |
| 3 | PCP-BODY-TYPE:TEXT |
| 4 | FIELD1:VALUE1 |
| 5 | FIELD2:VALUE2 |
| 6 | COUNTER:1 |
| 7 | |
| 8 | THIS IS THE BODY ! |

| TY. | PARAMETER | TYPING | DESCRIPTION |
|---|---|---|---|
| PC | REQUEST | TYPE REF TO YCL_HTTP_JSON_MESSAGE | HTTP FRAMEWORK (HTTP) HTTP REQUEST |
| PC | RESPONSE | TYPE REF TO YCL_HTTP_JSON_MESSAGE | SIMPLE JSON ACCESS |
| PC | CONTEXT | TYPE REF TO YCL_ACF_SERVER_CONTEXT | ELK APPLICATION |

ACTIVE

| METHOD | FUNCTION |
|---|---|

```
1  METHOD FUNCTION.
2    CONTEXT -> LOG ( |ASAP-HTTP-TRIGGER FUNCTION PROCESSED THE REQUEST: { (REQUEST->SERIALIZE( ) ) } ).
3    IF REQUEST -> GET ('QUERY-NAME') IS NOT INITIAL OR
4       REQUEST -> GET ('BODY-NAME') IS NOT INITIAL.
5       REQUEST -> GET ( 1_PATH = 'STATUS' 1_VALUE = '200'
6                     )->SET ( 1_PATH = 'BODY' 1_VALUE = |HELLO {REQUEST->GET('QUERY,NAME')} & {REQUEST->GET('BODY...
7    ELSE.
8       RESPONSE->SET( 1_PATH = 'STATUS' 1_VALUE = '400'
9                    )->SET( 1_PATH = 'BODY' 1_VALUE = 'PLEASE PASS A NAME AS THE QUERY STRING OR IN THE REQUES...
10   ENDIF.
11 ENDMETHOD.
```

EDITOR

APC IMPLEMENTATION UI SIDE

```
// OPEN A WEBSOCKET CONNECTION
WS = NEW SAP.UI.CORE.WS.SAPPCPWEBSOCKET('/SAP/BC/APC/SAP/DEMO_APC' , SAP.UI.CORE.WS.SAPPCPWEBSOCKET.
SUPPORTED_PROTOCOLS.V10);

WS.ONOPEN = FUNCTION()
{   // SEND DATA
    WS.SEND("SENDING MESSAGE _");
    ...
};

WS.ONMESSAGE = FUNCTION (MG)
{   // PROCESS RECEIVED MESSAGE
    ALERT (MSG.DATA);
    ...
};

WS.ONCLOSE = FUNCTION (MSG)
{   // WEBSOCKET IS CLOSED
    ...
};
```

APPLICATION SERVER PROGRAMMING LANGUAGE CLOUD FUNCTIONS

TECHNICAL FIELD

The subject matter disclosed herein generally relates to application server programming languages, such as Advanced Business Application Programming (ABAP). Specifically, the present disclosure addresses systems and methods to provide application server programming language cloud functions.

BACKGROUND

DevOps is a software development methodology that combines software development with information technology operations. The goal of DevOps is to shorten the systems development life cycle while also delivering features, fixes, and updates frequently in close alignment with business objectives. The DevOps approach is to include automation and event monitoring at all steps of the software build.

Platform as a Service (PaaS) is a category of cloud computing services that provides a platform allowing customers to develop, run, and manage applications without the complexity of building and maintaining the infrastructure typically associated with developing and launching an app.

Cloud providers can provide DevOps capabilities for the development of event-based functions. These capabilities include large sets of convenient and development-friendly tools for development of event (trigger) based cloud functions. Examples of such DevOps capabilities can be found in Microsoft Azure Functions, Amazon Web Services (AWS) Lambda Functions, and Google Cloud Functions. All of these functions, however, are language specific, and languages supported include JavaScript, Java, C #, and F #. Other cloud-based programming languages, such as ABAP, are not supported by these solutions. Additionally, other cloud-based DevOps capability solutions are limited to PaaS implementations and are not extendible to On-Premise and in-memory database deployments.

BRIEF DESCRIPTION OF THE DRAWINGS

Some embodiments are illustrated by way of example and not limitation in the figures of the accompanying drawings.

FIG. 2 shows the structure of a PCP message, in accordance with an example embodiment.

FIG. 3 is a diagram illustrating which developer tools will show as log entries and content, in accordance with an example embodiment.

FIG. 4 is a diagram illustrating log entries and content in an ABAP push channel (APC) application, in accordance with an example embodiment.

FIG. 5 is a screen capture of an ABAP Cloud Function implementation as ABAP class and its editor, in accordance with an example embodiment.

FIG. 11 is a diagram illustrating an ABAP push channel implementation on the user interface (UI) side, in accordance with an example embodiment.

DETAILED DESCRIPTION

In an example embodiment, a WebSocket is used as an abstraction layer on top of one or more triggers. These triggers may be defined by DevOps tools and maybe called bidirectionally. Specifically, a web application can call a trigger located in a Function as a Service layer at an ABAP application server, while the ABAP application server can also push data via a push channel through the WebSocket to trigger functions in the Web App. This provides a technical advantage over alternative ways to call triggers, such as using HyperText Transfer Protocol (HTTP), which is unidirectional. Additionally, performance and overhead advantages are gained by using WebSocket as a WebSocket needs only be set up once and then subsequent calls within the WebSocket require little or no overhead or processing, whereas HTTP would require authentication with each call. Furthermore, parallel processing is much easier to implement using WebSocket because triggers can be multiplexed in the WebSocket allowing for parallel execution of the underlying functions.

WebSocket is a communications protocol that provides full-duplex communication channels over a single Transport Control Protocol (TCP) connection. The WebSocket protocol enables interaction between a web client and a web server with lower overhead, facilitating real-tie data transfer from and to the server. This is made possible by providing a standardized way for the server to send content to the client without being first requested by the client and allowing messages to be passed back and forth while keeping the connection open.

Figure 1:
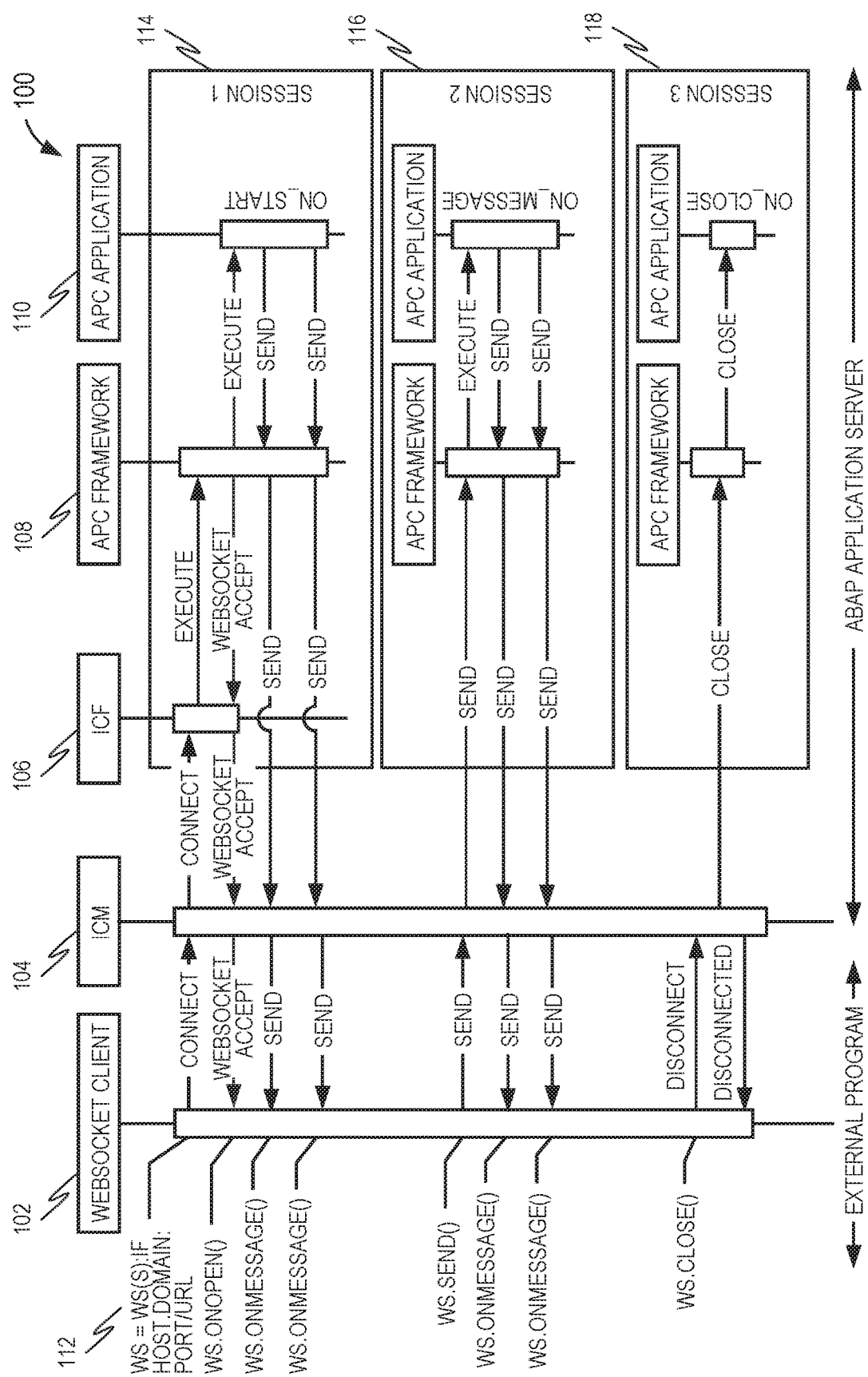
FIG. 1 is a block diagram illustrating an interaction model of WebSocket in an ABAP Application Server, in accordance with an example embodiment.

A successful connection between the ABAP application server and the web app is accomplished via the WebSocket protocol-specific connect/accept interaction as well as a correct authentication and identification of the WebSocket application. After connection setup, the WebSocket framework instantiates and executes the addressed WebSocket application (in the same WebSocket user session). The WebSocket channel can be used bi-directionally for the communication between a WebSocket client and application. FIG. 1 is a block diagram illustrating an interaction model 100 of WebSocket in an ABAP Application Server, in accordance with an example embodiment.

The interaction model 100 includes a WebSocket client 102, Internet Communication Manager (ICM) 104, Internet Communication Framework 106, APC Framework 108, and APC Application 110. On the left side of the WebSocket client 102 are commands 112 that, when executed by the WebSocket client 102, interact with the ICM 104 to perform various tasks. For example, in session 1 114, a command ws=ws(s)://hostdomain:port/URL acts to generate a connect command to the ICM 104, which forwards it to the ICF 106, which then executes a WebSocket setup command on the APC Framework 108. Once the WebSocket is established, the APC Framework 108 sends a WebSocket accept response to the ICF 106, which forwards it to the ICM 104, which then forwards it to the WebSocket Client 102. Bidirectional communication on the WebSocket is then possible. Here, the APC Application 110 then pushes two different send messages to the WebSocket client 102.

In session 2 116, the WebSocket client 102 generates and sends a message to the APC application 110. In session 3 118, the WebSocket Client 102 initiates a disconnect from the WebSocket, which causes the ICM 104 to generate a close command to the APC application 110.

For each WebSocket communication, an ABAP Push channel defined as a repository object can be used. Each push channel has two more repository objects that are generated when creating a push channel: (1) a node in the ICF service tree that is displayed in transaction SICF (this node represents the web address of the push channel) and (2) a push channel handler class that is stored as a global class in the ABAP class library and can be processed in a class builder (the push channel framework generates an instance of the class as a push channel handler during communication with a push channel).

A push channel Protocol (PCP) is a messaging protocol specified for sending messages with context information and metadata (e.g., a content type (XML, JSON, binary). The motivation for PCP is that applications that use WebSockets are usually interested in a number of push services. This means that the ABAP server may send different push messages to the application's UI via the same WebSocket connection. In order to distinguish messages from different push services, the messages can contain context information in a well-defined format.

However, in contrast to HTTP messages, WebSocket messages do not provide a data structure (e.g., header fields) that can be used to transmit context information and metadata. The WebSocket protocol, however, supports subprotocols, which can provide a data structure to embed such information.

PCP is registered as a WebSocket subprotocol at the Internet Assigned Numbers Authority (IANA). The PCP messages comprise (header) fields and a plain body which is separated by line feeds (LF, i.e., \n–0x0A (hexadecimal)–10 (decimal)). A field entry contains name-value pair separated by ":" character, i.e., <name>:<value>. The names and values are in UTF-8 characters and case-sensitive. The names and values should not contain the special characters LF, ":" and "\". In that case the special characters are escaped with the escape character "\" whereas LF is replaced by "\n". Each field entry, i.e., <name>:<value>, is terminated by a line feed. The last field entry is completed with double i.e., LFLF, independently of the existence of a body. In case of the existence of a body, this content is appended after the double LFs. The body contains UTF-8 characters. A body in binary is encoded in Base64 format. Additionally, field name or values do not contain leading or trailing spaces (i.e., white spaces). The field names starting with the prefix "pcp-" are reserved for PCP library and are not used by the application.

A PCP message can be more formally described using the Backus-Naur Form (BNF) grammar used in HTTP/1.1. RFC 2616. FIG. 2 shows the structure 200 of a PCP message, in accordance with an example embodiment.

The WebSocket log of a WebSocket connection to an ABAP push channel application using subprotocol "v10.pcp.sap.com" will show following records, when the client sends a PCP message with two fields and a body and the following values.

Field 1 consisting of field name "field1" and field value "value1"

Field 2 consisting of field name "field2" and field value "field2"

A body containing the text "this is the body!"

FIG. 3 is a diagram illustrating which Developer tools will show as log entries 300 and content 302.

In this example the APC application returns the received message, including the additional field with the field name "counter" and the field value "1", as depicted in FIG. 4 with log entries 400 and content 402.

Example methods and systems are directed to an environment including ABAP Cloud Functions running on an ABAP application server as a PaaS. The ABAP Cloud Functions can also be extended to On-Premise and in-memory database deployments. The ABAP Cloud Functions provide a cloud-like development, monitoring, and troubleshooting functions and its billing can be based on consumer/allocated resources. Furthermore, an ABAP-based extensibility infrastructure for existing ABAP-based applications can be provided as an alternative to Java and JavaScript (NodeJS) based architecture.

The event-based ABAP Cloud Functions enable the development of new business applications with less effort and reduced ownership costs. It enables not only cloud-like and ready-to-use development of applications based on the ABAP language, but can also be used for out of process extensibility for other business applications.

In an example embodiment, a browser-based editor can be implemented using JavaScript-based source code editors and existing Representational State Transfer (REST) Application Program Interfaces (APIs) used for integration of ADT in Eclipse. FIG. 5 is a screen capture 500 of an ABAP Cloud Function implementation as ABAP class and its editor, in accordance with an example embodiment.

In an example embodiment, the test and log console for execution of functions can also be implemented as JavaScript, such as a Fiori/UI5 application like Postman. Applicant, runtime logs, and statistical data can be retrieved from the ABAP Application Server using correlation identifications (based on ABAP Extended Passport identifications) and pushed via WebSocket to the user console.

Figure 6:
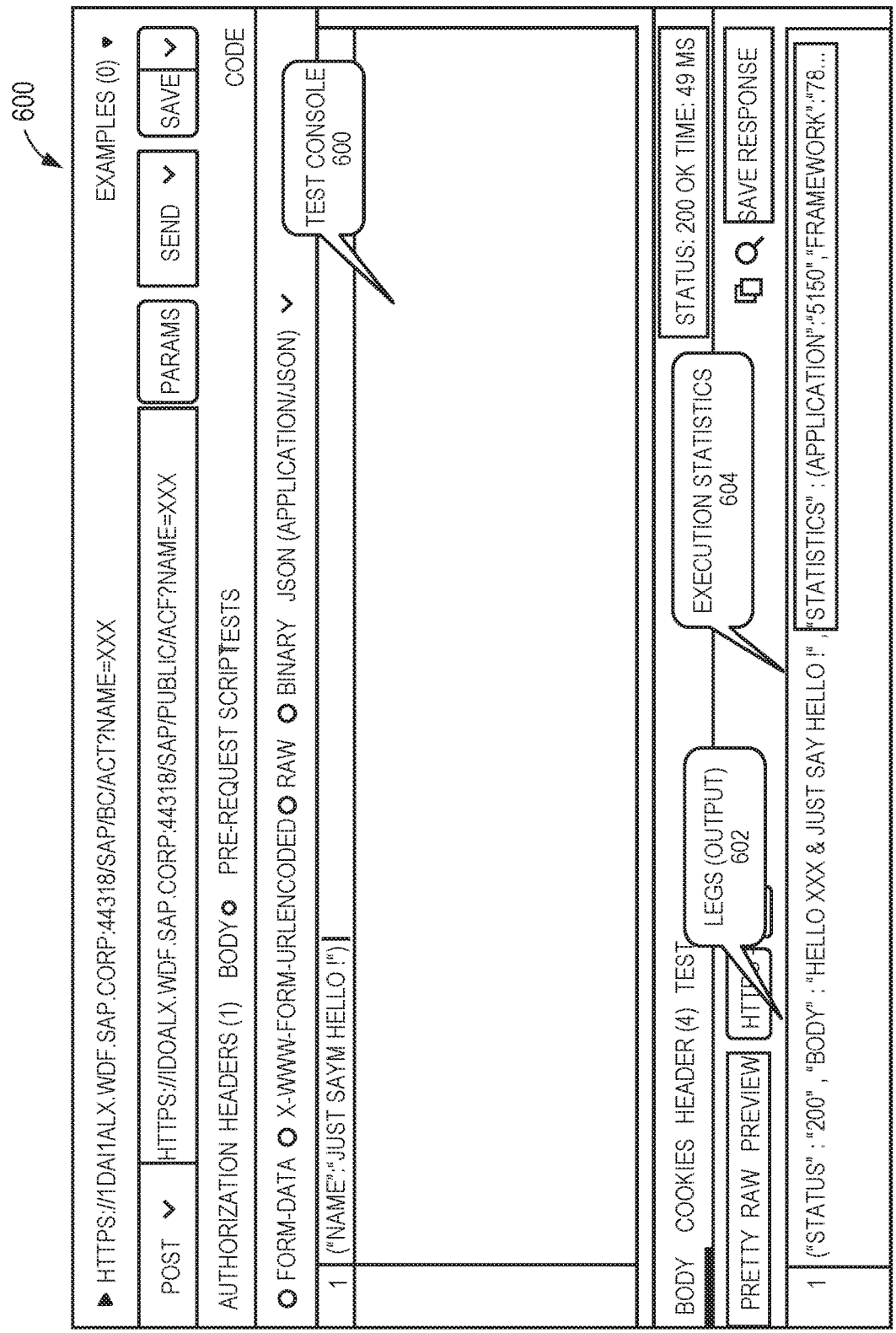
FIG. 6 is a screen capture of a test console, in accordance with an example embodiment.

FIG. 6 is a screen capture 600 of a test console, in accordance with an example embodiment. For the identification of a function's sources, the assigned ABAP package identification may be used, and during execution of the function, the recorded application log, statistical logs, and traces may be used to generate and use correlation identifications. Logs 602 and execution statistics 604 may also be displayed.

Figure 7:
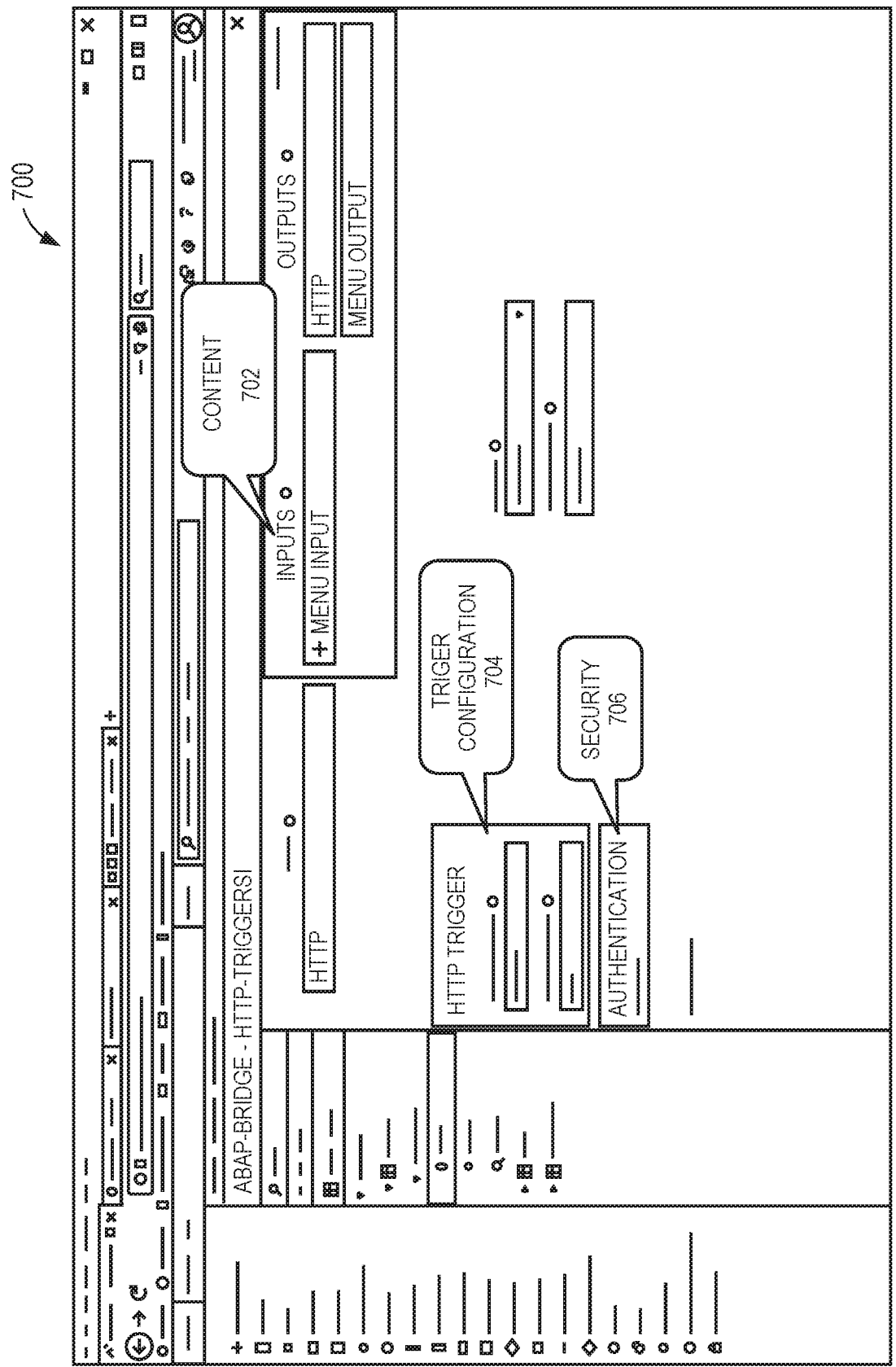
FIG. 7 is a screen capture illustrating an "integrate" console, in accordance with an example embodiment.

FIG. 7 is a screen capture illustrating an "integrate" console 700, in accordance with an example embodiment. Besides security and access rights configurations, context bindings 702 are also used for accessing additional resources as input, such as database resources, and triggering subsequent events as output. Trigger configuration 704 and security 706 may also be displayed The security and access rights configuration for ABAP Cloud Functions can be established by adoption of configuration and customization tools. For example, for an anonymous access of a Webhook function type, in ABAP either a public HTTP service can be used or, alternatively, a service user with a dedicated right can be used to access the Advanced Custom Field (ACF) of type Webhook. Furthermore, for administration and accessing of external or cloud function resources, a cloud platform communication arrangement can be used.

Figure 8:
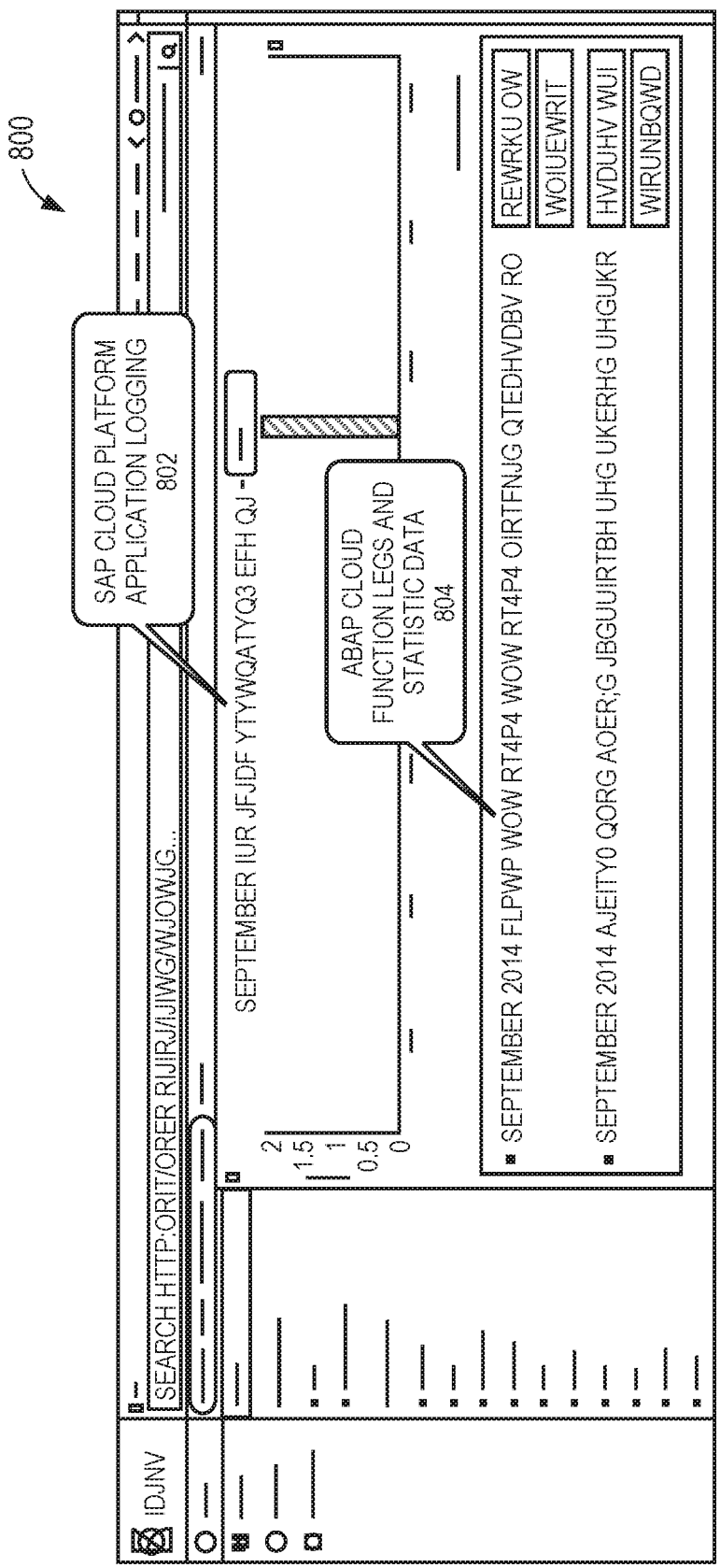
FIG. 8 is a screen capture illustrating an ABAP cloud function monitor integrated in an application logging service, in accordance with an example embodiment.

Additionally, an ABAP cloud application logging infrastructure can be used, to perform analytics and end-to-end troubleshooting and analysis of application execution flows comprising different functions and services. FIG. 8 is a screen capture 800 illustrating an ABAP cloud function monitor integrated in an Application logging service, in accordance with an example embodiment. This includes cloud platform application logging 802 and cloud function logs and statistical data 804.

Most ABAP applications use polling techniques to achieve an event-driven communication. For pushing an event from an ABAP backend to a browser based user agent like SAPUI5, Web Dynpro, Business Server Pages (BSP) or WebGUI, a multi-second interval polling is frequently used. This is a system resource-consuming technique. In SAPGUI, the timer control is usually used to detect an event in the ABAP backend system. ABAP Channels technology replaces such inefficient eventing based on polling techniques through push notifications based on publish-subscribe infrastructure and WebSockets in ABAP.

Figure 9:
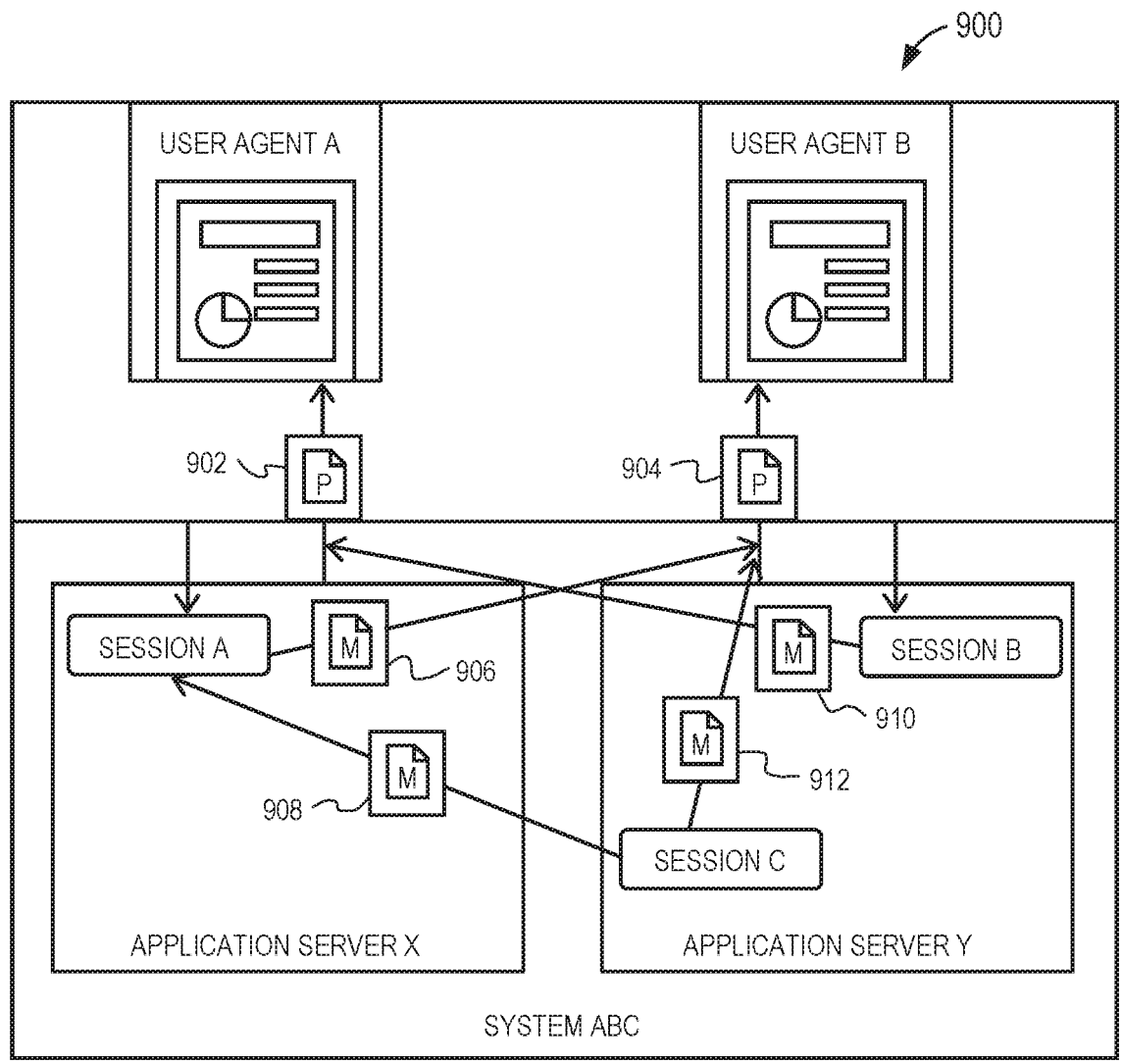
FIG. 9 is a block diagram illustrating two main ABAP channels, in accordance with an example embodiment.

The main purpose of ABAP Channels is to provide native support of interactive and collaborative scenarios based on event-driven architecture. There are two main communication channels in ABAP Channels. FIG. 9 is a block diagram illustrating the two main ABAP Channels 900, in accordance with an example embodiment. The first is ABAP push channels, which are used for bi-directional communication with user agents via WebSockets in ABAP. In FIG. 9, documents 902, 904 (marked with P) mark the ABAP push channel Communication paths. Here the user interface automatically updates when the data changes. The second is ABAP Messaging Channels, which provide a publish/subscribe infrastructure for exchange of messages between either user sessions or user session and user agents. Documents 906, 908, 910, 912 (marked with an M) designate the ABAP Messaging Channel Communication Paths. Here data changes are published to subscribed clients immediately.

Figure 10:
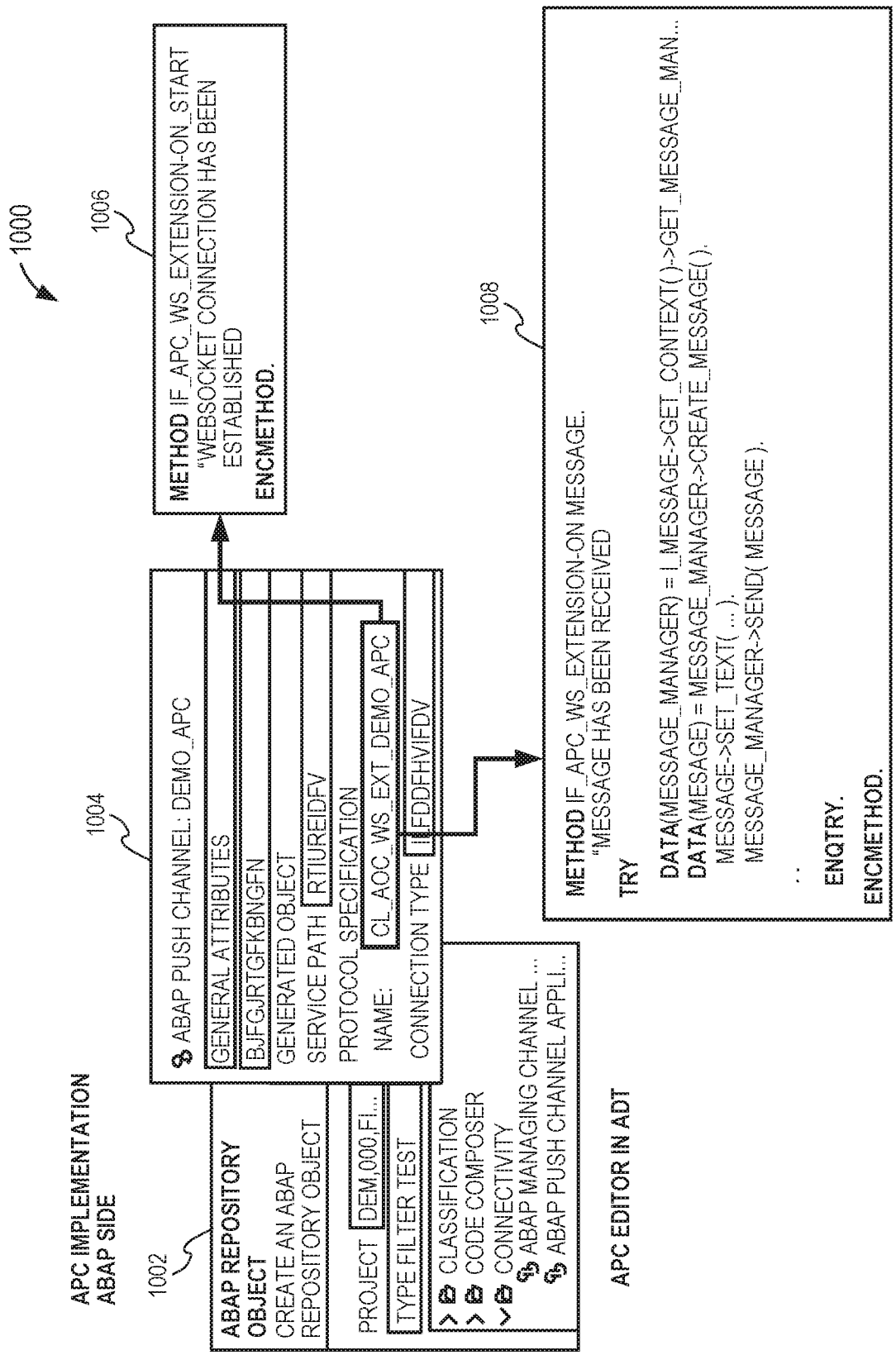
FIG. 10 is a diagram illustrating ABAP push channel implementation on the ABAP Application server side, in accordance with an example embodiment.

FIG. 10 is a diagram illustrating ABAP push channel implementation 1000 on the ABAP Application server side, in accordance with an example embodiment. An APC editor in ADT 1002 allows for creation of an ABAP repository object 1004. The ABAP repository object 1004 contain a class name that correlates to two methods 1006, 1008. The first method 1006 is executed to detect that a WebSocket connection has been established. The second method 1008 is executed when a message has been received over the WebSocket connection.

FIG. 11 is a diagram illustrating an ABAP push channel implementation 1100 on the UI side, in accordance with an example embodiment. Here, a method 1102 is executed to open a Web Socket connection, send data over the web socket, process a received message, and detect that the WebSocket connection has been closed.

Figure 12:
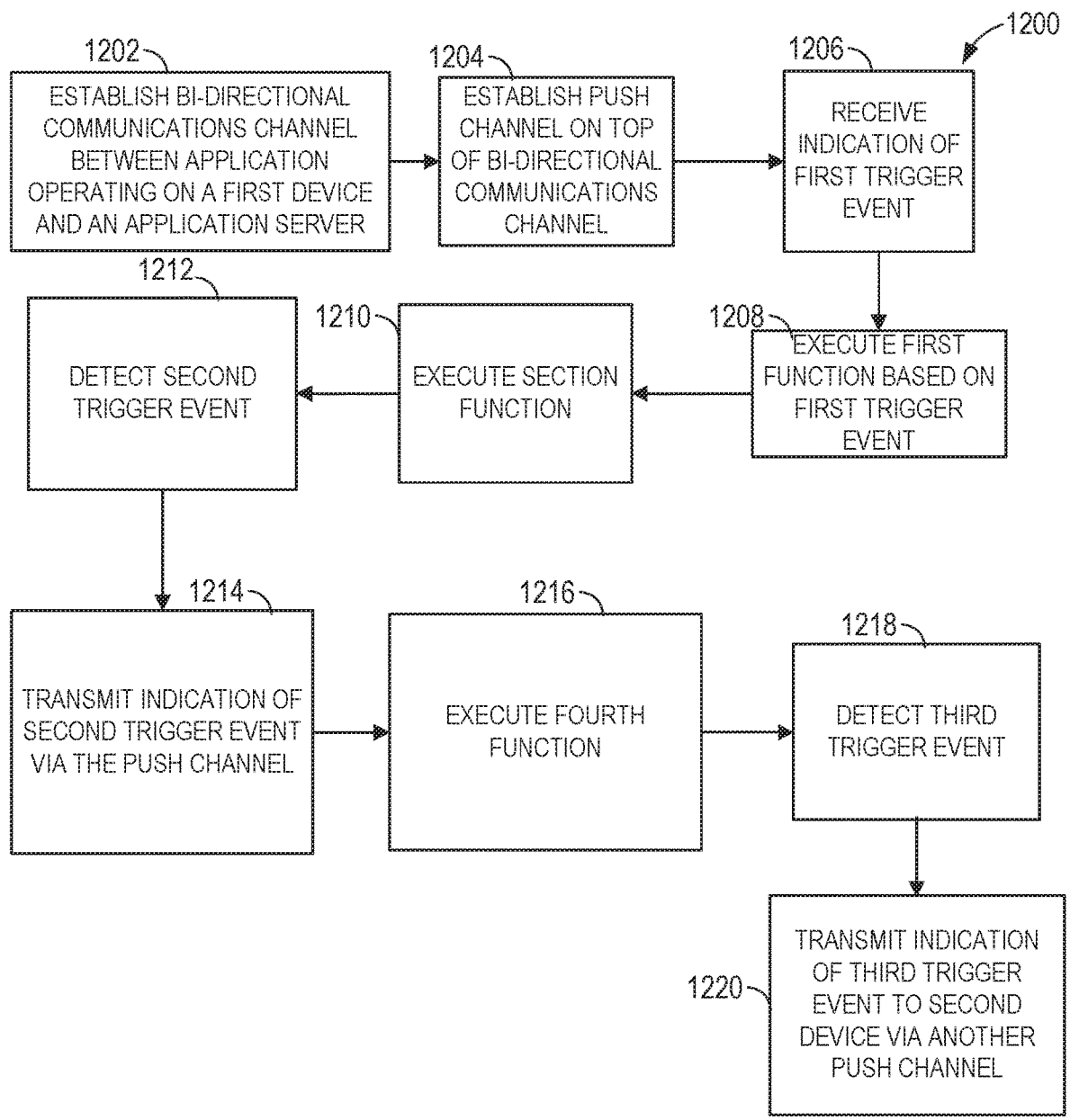
FIG. 12 is a flow diagram illustrating a method 1200, in accordance with an example embodiment.

FIG. 12 is a flow diagram illustrating a method 1200, in accordance with an example embodiment. At operation 1202, a bi-directional communications channel between an application operating on a first device in a computer network and an application server is established. At operation 1204, a push channel on top of the bi-directional communications channel is established.

At operation 1206, an indication of a first trigger event is received from the first device at the application server. The application server receives the indication via the push channel. At operation 1208, in response to the indication of the first trigger event, a first function is executed based on the first trigger event at the application server.

At operation 1210, a second function is executed at the application server. At operation 1212, a second trigger event is detected during the execution of the second function. At operation 1214, an indication of the second trigger event is transmitted to the first device, via the push channel, to cause execution of a third function on the first device.

At operation 1216, a fourth function is executed on the application server. At operation 1218, a third trigger event is detected during the execution of the fourth function. At operation 1210, in response to the detection of the third trigger event, an indication of the third trigger event is transmitted to a second device via another push channel, to cause execution of a fifth function on the second device.

EXAMPLES

Example 1. A system comprising:
  at least one hardware processor; and
  a computer-readable medium storing instructions that, when executed by the at least one hardware processor, cause the at least one hardware processor to perform operations comprising:
    establishing a bi-directional communications channel between an application operating on a first device in a computer network and an application server;
    establishing a push channel on top of the bi-directional communications channel;
    receiving, at the application server, an indication of a first trigger event from the first device, the application server receiving the indication via the push channel; and
    executing, at the application server, a first function based on the first rigger event.

Example 2. The system of Example 1, wherein the operations further comprise:
  executing, at the application server, a second function;
  detecting a second trigger event during the execution of the second function;
  transmitting an indication of the second trigger event to the first device via the push channel, to cause execution of a third function on the first device.

Example 3. The system of Examples 1 or 2, wherein the operations further comprise:
  executing, at the application server, a fourth function;
  detecting a third trigger event during the execution of the fourth function;
  transmitting an indication of the third trigger event to a second device via another push channel, to cause execution of a fifth function on the second device.

Example 4. The system of any of Examples 1-3, wherein the application server is an Advanced Business Application Programming (ABAP) application server.

Example 5. The system of any of Examples 1-4, wherein the hi-directional communications channel is a WebSocket.

Example 6. The system of any of Examples 1-5, wherein the push channel is an ABAP push channel.

Example 7. The system of any of Examples 1-6, wherein the trigger event occurs in a development tool operating on the first device.

Example 8. A method comprising:
establishing a bi-directional communications channel between an application operating on a first device in a computer network and an application server;
establishing a push channel on top of the bi-directional communications channel;
receiving, at the application server, an indication of a first trigger event from the first device, the application server receiving the indication via the push channel; and
executing, at the application server, a first function based on the first r event.

Example 9. The method of Example 8, wherein the operations further comprise:
executing, at the application server, a second function;
detecting a second trigger event during the execution of the second function;
transmitting an indication of the second trigger event to the first device via the push channel to cause execution of a third function on the first device.

Example 10. The method of Examples 8-9, wherein the operations further comprise:
executing, at the application server, a fourth function;
detecting a third trigger event during the execution of the fourth function;
transmitting an indication of the third trigger event to a second device via another push channel to cause execution of a fifth function on the second device.

Example 11. The method of any of Examples 8-10, wherein the application server is an Advanced Business Application Programming (ABAP) application server.

Example 12. The method of any of Examples 8-11, wherein the bi-directional communications channel is a WebSocket.

Example 13. The method of any of Examples 8-12, wherein the push channel is an ABAP push channel.

Example 14. The method of any of Examples 8-13, wherein the trigger event occurs in a development tool operating on the first device.

Example 15. A non-transitory computer-readable medium that stores instructions that, when executed by one or more processors, cause the one or more processors to perform operations comprising:
establishing a bi-directional communications channel between an application operating on a first device in a computer network and an application server;
establishing a push channel on top of the bi-directional communications channel;
receiving, at the application server, an indication of a first trigger event from the first device, the application server receiving the indication via the push channel; and
executing, at the application server, a first function based on the first trigger event.

Example 16. The non-transitory computer-readable medium of Example 5, wherein the operations further comprise:
executing, at the application server, a second function;
detecting a second trigger event during the execution of the second function;
transmitting an indication of the second trigger event to the first device via the push channel to cause execution of a third function on the first device.

Example 17. The non-transitory computer-readable medium of Examples 15 or 16, wherein the operations further comprise:
executing, at the application server, a fourth function;
detecting a third trigger event during the execution of the fourth function;
transmitting an indication of the third trigger event to a second device via another push channel to cause execution of a fifth function on the second device.

Example 18. The non-transitory computer-readable medium of any of Examples 15-17, wherein the application server is an Advanced Business Application Programming (ABAP) application server.

Example 19. The non-transitory computer-readable medium of any of Examples 15-18, wherein the bi-directional communications channel is a WebSocket.

Example 20. The non-transitory computer-readable medium of any of Examples 15-19, wherein the push channel is an ABAP push channel.

Figure 13:
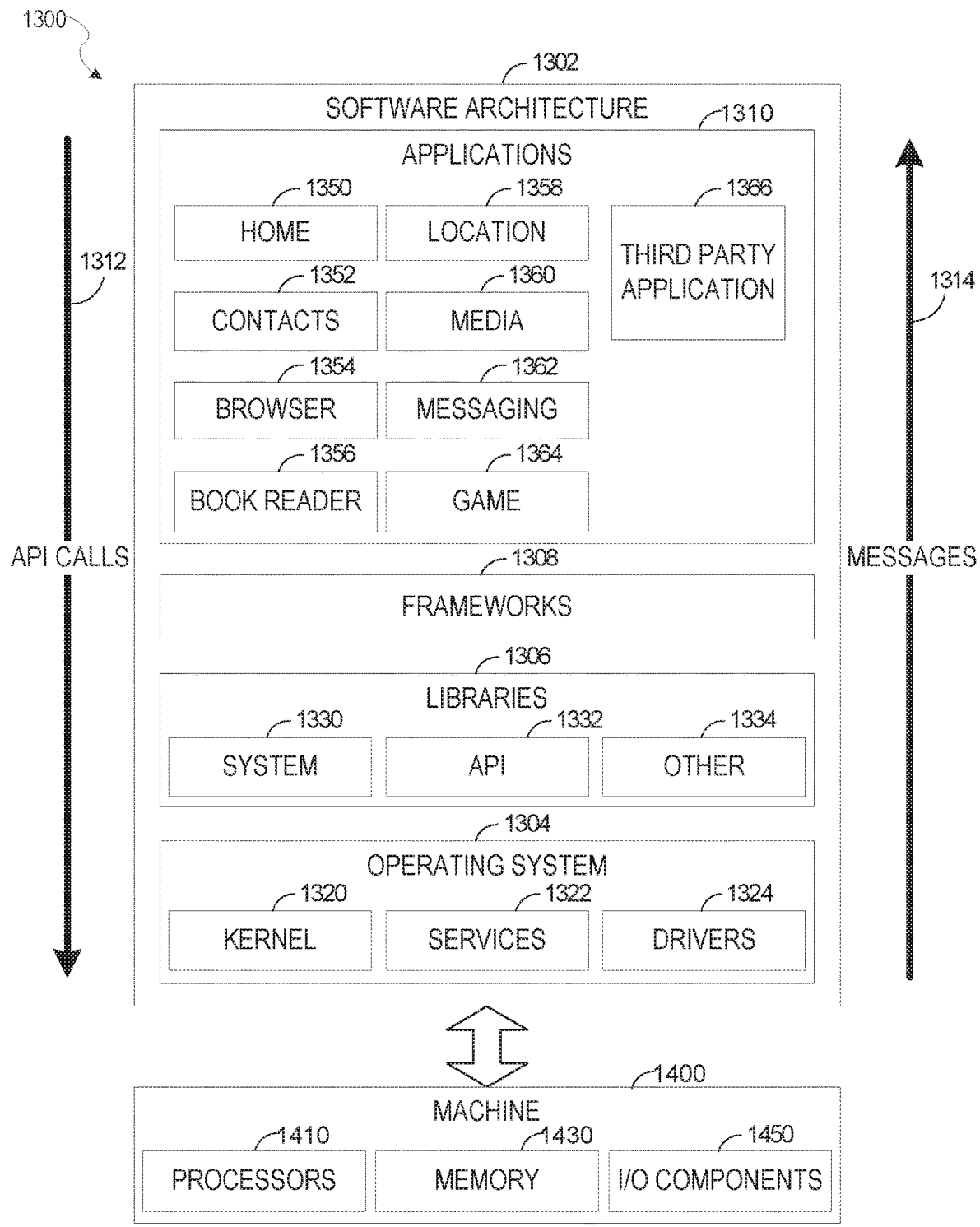
FIG. 13 is a block diagram illustrating an architecture of software, which can be installed on any one or more of the devices described above.

FIG. 13 is a block diagram 1300 illustrating an architecture of software 1302, which can be installed on any one or more of the devices described above. FIG. 13 is merely a non-limiting example of a software architecture, and it will be appreciated that many other architectures can be implemented to facilitate the functionality described herein. In various embodiments, the software 1302 is implemented by hardware such as a machine 1400 of FIG. 14 that includes processors 1410, memory 1430, and input/output (I/O) components 1450. In this example architecture, the software 1302 can be conceptualized as a stack of layers where each layer may provide a particular functionality. For example, the software 1302 includes layers such as an operating system 1304, libraries 1306, frameworks 1308, and applications 1310. Operationally, the applications 1310 invoke API calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or PG), or Portable Network Graphics (MG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphical user interface (GUI) functions, high-level resource management, high-level location services, and so forth. The frameworks 1308 can provide a broad spectrum of other APIs that can be utilized by the applications 1310, some of which may be specific to a particular operating system 1304 or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications, such as a third-party application 1366. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third-party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1366 can invoke the API calls 1312 provided by the operating system 1304 to facilitate functionality described herein.

Figure 14:
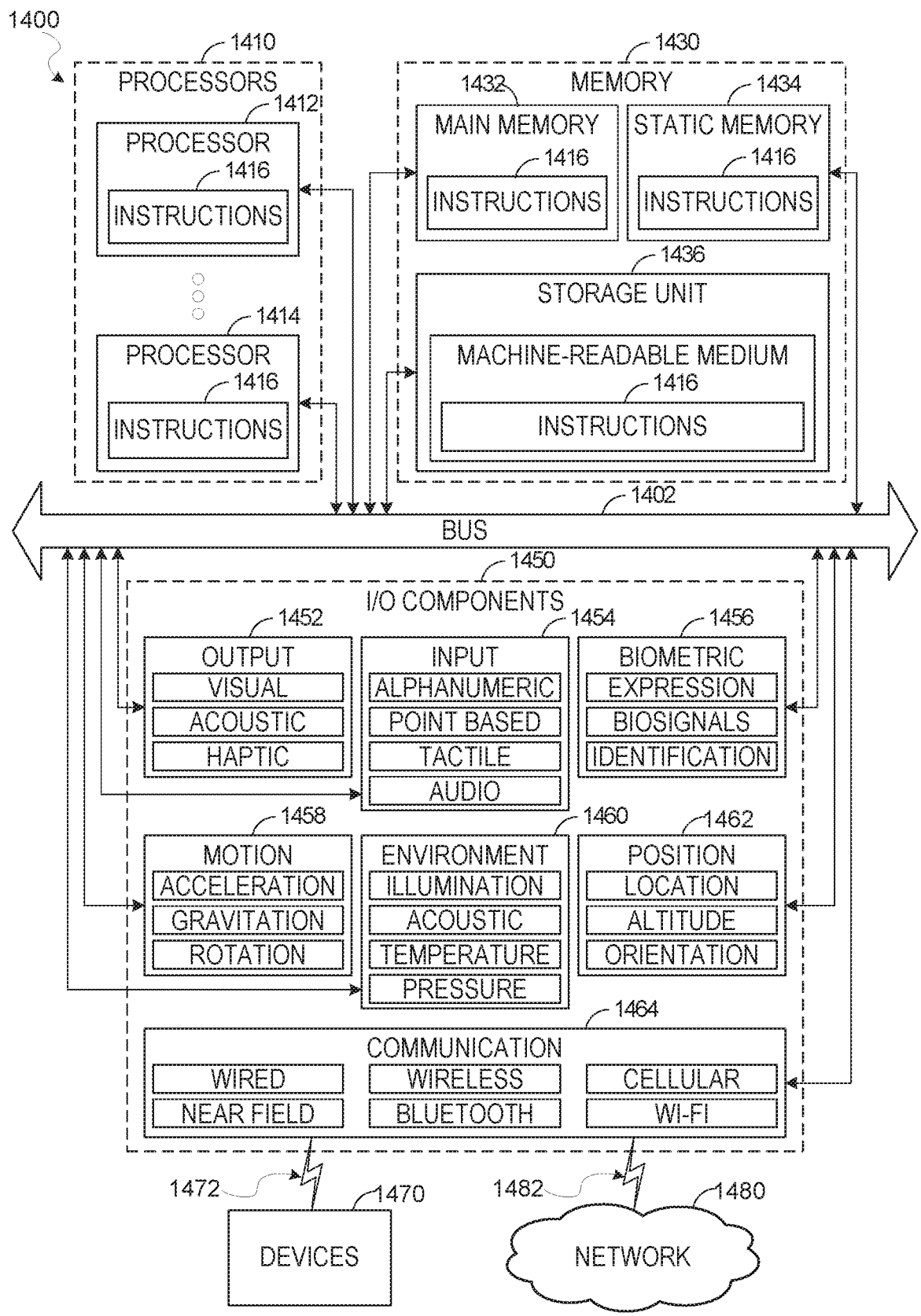
FIG. 14 illustrates a diagrammatic representation of a machine in the form of a computer system within which a set of instructions may be executed for causing the machine to perform any one or more of the methodologies discussed herein, according to an example embodiment.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an apples, an app, or other executable code) for causing the machine 1400 to perform any one or more of the methodologies discussed herein may be executed. For example, the instructions 1416 may cause the machine 1400 to execute the method 1200 of FIG. 12. Additionally, or alternatively, the instructions 1416 may implement FIGS. 1-12 and so forth. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RTIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions 1416 contemporaneously. Although FIG. 14 shows multiple processors 1410, the machine 1400 may include a single processor 1412 with a single core, a single processor 1412 with multiple cores (e.g., a multi-core processor 1412), multiple processors 1412, 1414 with a single core, multiple processors 1412, 1414 with multiple cores, or any combination thereof.

The memory 1430 may include a main memory 1432, a static memory 1434, and a storage unit 1436, each accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion, and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., by voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., coupled via a USB).

Moreover, the communication components 1464 may detect identifiers or include components operable to detect identifiers. For example, the communication components 1464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

The various memories (i.e., 1430, 1432, 1434, and/or memory of the processor(s) 1410) and/or the storage unit 1436 may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third. Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long- Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., HTTP). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   establishing a bi-directional communications channel between an application operating on a first device in a computer network and an application server;
   establishing a push channel on top of the bi-directional communications channel;
   receiving, at the application server, an indication of a first trigger event from the first device, the application server receiving the indication via the push channel, wherein the first trigger event is a request for runtime logs, from a test and log console, using correlation identifications; and
   executing, at the application server, a first function based on the first trigger event.

2. The system of claim 1, wherein the operations further comprise:
   executing, at the application server, a second function;
   detecting a second trigger event during the execution of the second function;
   transmitting an indication of the second trigger event to the first device via the push channel, to cause execution of a third function on the first device.

3. The system of claim 1, wherein the operations further comprise:
   executing, at the application server, a fourth function;
   detecting a third trigger event during the execution of the fourth function;
   transmitting an indication of the third trigger event to a second device via another push channel, to cause execution of a fifth function on the second device.

4. The system of claim 1, wherein the application server is an Advanced Business Application Programming (ABAP) application server.

5. The system of claim 1, wherein the bi-directional communications channel is a Web Socket.

6. The system of claim 1, wherein the push channel is an ABAP push channel.

7. The system of claim 1, wherein the trigger event occurs in a development tool operating on the first device.

8. A method comprising:
   establishing a bi-directional communications channel between an application operating on a first device in a computer network and an application server;
   establishing a push channel on top of the bi-directional communications channel;
   receiving, at the application server, an indication of a first trigger event from the first device, the application server receiving the indication via the push channel, wherein the first trigger event is a request for runtime logs, from a test and log console, using correlation identifications; and
   executing, at the application server, a first function based on the first trigger event.

9. The method of claim 8, wherein the operations further comprise:
   executing, at the application server, a second function;
   detecting a second trigger event during the execution of the second function;
   transmitting an indication of the second trigger event to the first device via the push channel, to cause execution of a third function on the first device.

10. The method of claim 8, wherein the operations further comprise:
    executing, at the application server, a fourth function;
    detecting a third trigger event during the execution of the fourth function;
    transmitting an indication of the third trigger event to a second device via another push channel, to cause execution of a fifth function on the second device.

11. The method of claim 8, wherein the application server is an Advanced Business Application Programming (ABAP) application server.

12. The method of claim 8, wherein the bi-directional communications channel is a Web Socket.

13. The method of claim 8, wherein the push channel is an ABAP push channel.

14. The method of claim 1, wherein the trigger event occurs in a development tool operating on the first device.

15. A non-transitory computer-readable medium that stores instructions that, when executed by one or more processors, cause the one or more processors to perform operations comprising:
    establishing a bi-directional communications channel between an application operating on a first device in a computer network and an application server;
    establishing a push channel on top of the bi-directional communications channel;
    receiving, at the application server, an indication of a first trigger event from the first device, the application server receiving the indication via the push channel, wherein the first trigger event is a request for runtime logs, from a test and log console, using correlation identifications; and executing, at the application server, a first function based on the first trigger event.

16. The non-transitory computer-readable medium of claim 15, wherein the operations further comprise:
   executing, at the application server, a second function;
   detecting a second trigger event during the execution of the second function;
   transmitting an indication of the second trigger event to the first device via the push channel, to cause execution of a third function on the first device.

17. The non-transitory computer-readable medium of claim 15, wherein the operations further comprise:
   executing, at the application server, a fourth function;
   detecting a third trigger event during the execution of the fourth function;
   transmitting an indication of the third trigger event to a second device via another push channel, to cause execution of a fifth function on the second device.

18. The non-transitory computer-readable medium of claim 15, wherein the application server is an Advanced Business Application Programming (ABAP) application server.

19. The non-transitory computer-readable medium of claim 15, wherein the bi-directional communications channel is a Web Socket.

20. The non-transitory computer-readable medium of claim 15, wherein the push channel is an ABAP push channel.

* * * * *